Mar. 20, 1923.
C. G. PULLIN
1,449,349
MEANS FOR ACTUATING CONTROL CABLES, RODS, BOWDEN WIRES, AND THE LIKE
Filed July 20, 1920
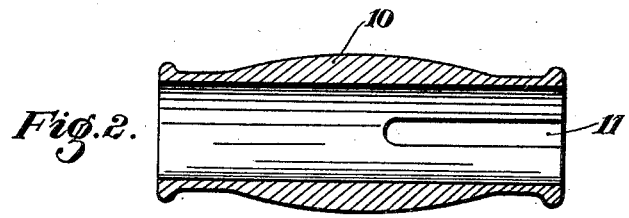
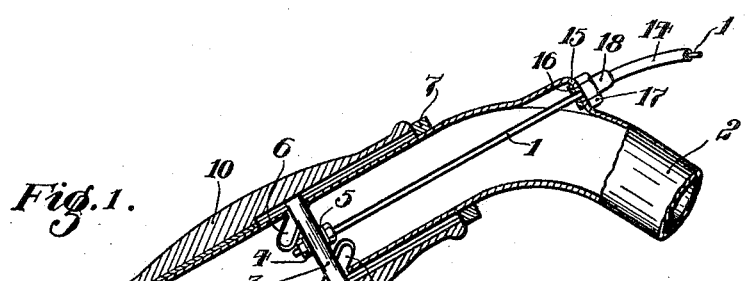
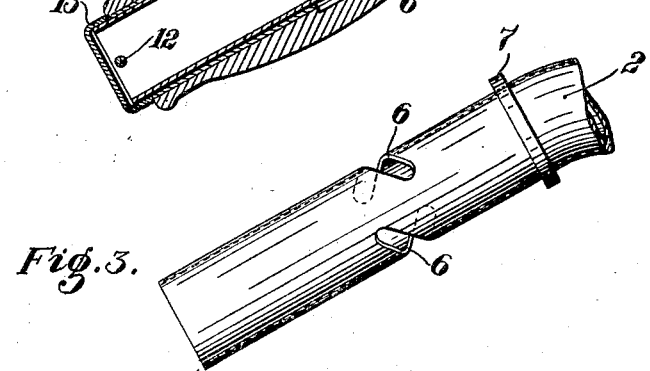
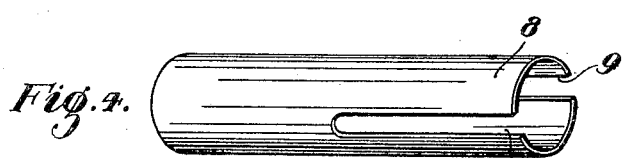
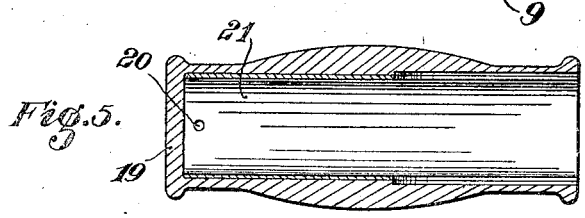
C. G. Pullin.
Inventor.
per: Eugene L. Brown
Attorney.

Patented Mar. 20, 1923.

1,449,349

UNITED STATES PATENT OFFICE.

CYRIL GEORGE PULLIN, OF ISLEWORTH, ENGLAND.

MEANS FOR ACTUATING CONTROL CABLES, RODS, BOWDEN WIRES, AND THE LIKE.

Application filed July 20, 1920. Serial No. 397,571.

*To all whom it may concern:*

Be it known that I, CYRIL GEORGE PULLIN, a subject of the King of Great Britain, residing at Isleworth, Middlesex, England, have invented certain new and useful Improved Means for Actuating Control Cables, Rods, Bowden Wires, and the like, of which the following is a specification.

This invention relates to improved means for actuating control cables, rods, Bowden wires, and the like, and has for its object to provide a simplified construction easily assembled and cheap to manufacture, and further particularly to provide means for controlling valves or the like and pertaining to internal combustion engines, or any control in which a cable Bowden wire or a rigid rod is in operation.

In order that my invention may be more clearly understood, I will now describe the application to a Bowden wire system, but it must be understood that I do not so limit my invention.

In the accompanying drawings is illustrated a means of actuating a Bowden cable control from a rotatable hand-grip on the handle-bar of a velocipede.

Fig. 1 shows a horizontal section through the handle-bar and grip.

Fig. 2 shows a section through the grip member, while detached from the handle-bar.

Fig. 3 shows the extremity of the handle-bar with the hand grip member removed.

Fig. 4 shows a pictorial view, a sleeve member having longitudinal grooves and hereafter fully referred to, while Fig. 5 shows a modified construction in which the hand grip member and the longitudinally grooved sleeve member are incorporated in a single hand grip unit.

The Bowden cable 1 is introduced into the interior of the handle bar 2 through a hole permitting the axial disposition of the cable relatively to the extremity of the handle bar. At the end of the cable, within the handle bar a hardened steel pin 3 is threaded on to the cable and secured in position in any suitable manner, such as nuts and washers 4, 5. The handle bar 2 is formed with a pair of inclined grooves 6 and a stop member 7 serving to locate the grip member of the handle bar. Rotatably mounted on the handle bar 2 is a longitudinally grooved sleeve member 8, in which the grooves 9 are located so that when the sleeve member is placed on the handle bar, the grooves 9 cross the grooves 6 of the handle bar. The grip member 10 is disposed over, and fixed to the sleeve member 8 and has longitudinal recesses 11 formed to register with the aforesaid groove 9 of the sleeve member. The grip member 10 may be retained in position on the handle bar and against the stop 7 by means of a fixing pin 12 and a cap 13.

Referring now particularly to Fig. 1, it will be seen that the hardened steel pin 3 is so formed as to provide a pair of opposite radial arms fixed to the cable 1 and having its extremities projecting into the inclined grooves 6 of the longitudinal grooves 7 at the points of crossing.

The operation of the construction is as follows:

On the rotation of the grip member 10, and consequently the longitudinally grooved sleeve member 8, an angular movement is imparted to the pin 3, the extremities of which are constrained in their movement by the inclined grooves 6, whereon a longitudinal displacement of the cable 1 is effected accordingly as the grip member 10 is rotated.

The casing 14 for the cable 1 may be secured to the handle bar by providing on the handle bar about the perforation, permitting the projection of the cable 1 into the handle bar, a flat face or protuberance 15 and a ferrule member 16 may be fitted in the perforation with an external threaded portion, projecting outwardly to receive and engage with a nut 17, which on being threaded on to the ferrule member 16, is adapted to clamp the extremity 18 of the cable 14 against the aforesaid flat face on the handle bar.

In the modification shown in Fig. 5, the hand grip is formed with a closed end 19 and with a perforation 20, permitting the projection thereto of a fixing pin member, such as 12. The grip is provided with a lining 21 of suitable material, and in which is formed longitudinal grooves in the same manner and of the same configuration as the grooves 9, while the required clearance is provided in the grip member itself, by cutting or otherwise forming longitudinal recesses, equivalent to the recesses 11 aforesaid.

It will be understood, that if preferred, more than two inclined grooves might be formed on the handle bar member and corresponding arms formed on the cable member, while similar co-operating longitudinal grooves will be formed on the sleeve member. Further, instead of a hardened steel pin, I could provide a disc member having the required number of radial spokes, projecting therefrom either integrally or removably secured to the said disc.

I claim:—

1. In combination, on a velocipede, a handle bar steering member having inclined grooves, a rotatable sleeve member having longitudinal grooves mounted on said steering member so disposed that said longitudinal grooves cross said inclined grooves, an axial reciprocable rod member within said handle bar member and extended without same, a transverse pin member threaded on said rod member so as to form two opposite radial arms projecting into said inclined and said longitudinal grooves at the points of crossing of said grooves, means preventing relative movement of said transverse member and said rod member, a hand grip fixed to said rotatable sleeve member, and means for retaining said sleeve member and hand grip on the handle bar steering member.

2. In combination, on a velocipede, a handle bar steering member having inclined grooves, a rotatable sleeve member having longitudinal grooves mounted on said steering member, so disposed, that said longitudinal grooves cross said inclined grooves, a flat clamping face formed on said handle bar steering member, a Bowden cable projected through said flat face into said handle bar, means for clamping the cable casing against said flat face, a transverse pin member threaded on said Bowden cable so as to form two opposite radial arms projecting into said inclined and said longitudinal grooves at the points of crossing of said grooves, means preventing relative movement of said transverse member and said rod member, a handle grip fixed to said rotatable sleeve member and means for retaining said sleeve member and hand grip on the handle bar steering member.

In testimony whereof I affix my signature.

CYRIL GEORGE PULLIN.